United States Patent
Karaffa

(10) Patent No.: US 8,903,520 B2
(45) Date of Patent: Dec. 2, 2014

(54) METHOD FOR EXECUTING SEQUENTIAL FUNCTION CHARTS AS FUNCTION BLOCKS IN A CONTROL SYSTEM

(75) Inventor: John Michael Karaffa, Roanoke, VA (US)

(73) Assignee: General Electric Company, Schenectady, NY (US)

( * ) Notice: Subject to any disclaimer, the term of this patent is extended or adjusted under 35 U.S.C. 154(b) by 1086 days.

(21) Appl. No.: 12/423,756

(22) Filed: Apr. 14, 2009

(65) Prior Publication Data

US 2010/0262265 A1    Oct. 14, 2010

(51) Int. Cl.
- G05B 19/42 (2006.01)
- G05B 11/01 (2006.01)
- G06F 9/44 (2006.01)
- G06F 9/45 (2006.01)
- G05B 19/05 (2006.01)

(52) U.S. Cl.
CPC .... *G05B 19/056* (2013.01); *G05B 2219/13019* (2013.01); *G05B 2219/13108* (2013.01)
USPC ............... 700/87; 700/18; 717/110; 717/140; 717/146

(58) Field of Classification Search
USPC ........................ 717/110, 140, 146; 700/18, 87
See application file for complete search history.

(56) References Cited

U.S. PATENT DOCUMENTS

| | | | |
|---|---|---|---|
| 5,801,942 A * | 9/1998 | Nixon et al. | 700/83 |
| 6,854,111 B1 * | 2/2005 | Havner et al. | 717/163 |
| 2002/0004804 A1 * | 1/2002 | Muenzel | 707/513 |
| 2002/0109358 A1 * | 8/2002 | Roberts | 290/54 |
| 2004/0019391 A1 * | 1/2004 | Ferraz et al. | 700/18 |
| 2005/0085928 A1 * | 4/2005 | Shani | 700/18 |
| 2005/0108693 A1 * | 5/2005 | Lo | 717/140 |
| 2008/0216060 A1 * | 9/2008 | Vargas | 717/137 |
| 2009/0005884 A1 * | 1/2009 | Ikegami et al. | 700/18 |
| 2009/0064103 A1 * | 3/2009 | Shih | 717/113 |
| 2009/0083719 A1 * | 3/2009 | Hsieh | 717/140 |
| 2010/0083223 A1 * | 4/2010 | Chouinard et al. | 717/110 |

FOREIGN PATENT DOCUMENTS

| | | |
|---|---|---|
| EP | 0435139 | 7/1991 |
| EP | 1150193 A1 * | 10/2001 |
| EP | 1795982 | 6/2007 |
| EP | 1795999 | 6/2007 |
| JP | 2003223204 A | 8/2003 |
| JP | 2008040995 A | 2/2008 |

OTHER PUBLICATIONS

Fritsche et al., Transformation of existing IEC 61131-3 automation projects into control logic according to IEC 61499, IEEE, 2008.*

Riedl et al. (SFC inside IEC 61499, IEEE, 2006).*

(Continued)

*Primary Examiner* — Darrin Dunn
(74) *Attorney, Agent, or Firm* — Fletcher Yoder, P.C.

(57) ABSTRACT

Systems and methods are provided for converting Sequential Function Chart (SFC) logic to function block logic for execution by a programmable controller. In one embodiment, a method includes receiving Sequential Function Chart (SFC) logic comprising Steps and Transition on a physical computing device, converting the Steps and Transitions of the Sequential Function Chart logic to function block logic on the physical computing device, and uploading the function block logic from the physical computing device to a controller.

17 Claims, 5 Drawing Sheets

(56) References Cited

OTHER PUBLICATIONS

U.S. Appl. No. 12/271,343, filed Nov. 14, 2008, William Robert Grubbs et al.

Heverhagen, T. et al.; http://www.functionblocks.org/Introduction.html.

Sequential Function Chart, http://en.wikipedia.org/wiki/Sequential_function_chart.

Hellgren A. et al; "On the Execution of Sequential Function Charts"; Control Engineering Practice, Pergamon Press, Oxford, GB; vol. 13, No. 10; Oct. 1, 2005; pp. 1283-1293; XP004949878.

Matthias Riedl et al: "SFC inside IEC 61499"; Emerging Technologies and Factory Automation, 2006. ETFA '06. IEEE Conference on, IEEE, PI; Sep. 1, 2006; pp. 662-666; XP031082631.

Unofficial English translation of a JP Office Action dated Feb. 18, 2014 issued in connection with corresponding JP Application No. 2010-088229.

* cited by examiner

METHOD FOR EXECUTING SEQUENTIAL FUNCTION CHARTS AS FUNCTION BLOCKS IN A CONTROL SYSTEM

BACKGROUND OF THE INVENTION

The subject matter disclosed herein relates to control systems, and, more specifically, to designing and executing logic on programmable controllers.

Control systems for processes, plants, and equipment, may include a wide variety of logic to configure how the control system monitors and controls the processes, plants and equipment. A control system may include one or more programmable controllers. To enable design of the logic for a controller and to provide easier configuration, the control system logic may be displayed in various forms on a graphical user interface (GUI).

The graphical user interface (GUI) may be accessible to a user, and the user may design the logic and configure the controller from the GUI. The GUI may present design of the control logic by presenting the logic in a standard format and/or programming language. Sequential Function Charts (SFC) is a programming language defined according to the International Electrotechnical Commission (IEC) 61131-3 standard. Such SFC control logic may not be executable or understood by certain programmable control systems of a controller.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a method includes receiving SFC logic on a physical computing device wherein the SFC logic includes Steps and Transitions and converting the Steps and Transitions to function blocks on the physical computing device. The method also includes uploading the function block logic from the physical computing device to a controller.

In a second embodiment, a physical computing device comprises a tangible machine-readable medium comprising code adapted to provide an SFC editor to a user, receiving first application code comprising an SFC model, convert the first application code to second application code comprising blockware, and output the second application code.

In a third embodiment, a system includes a programmable logic controller that includes function blocks executable to perform one or more control functions, wherein the function blocks are translated from a Sequential Function Chart model via a block library.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Embodiments of the present invention include techniques for executing Sequential Function Chart (SFC) as blockware (e.g., function blocks) in a programmable controller. Embodiments include receiving Sequential Function Chart (SFC) logic comprising Steps and Transitions, converting the Steps and Transitions of the Sequential Function Chart (SFC) logic to function block logic, and uploading the function block logic from a physical computing device to a controller. These Steps and Transitions may be designed according to the SFC Specification (IEC 61131-3). Function blocks of the function block logic generally include inputs (such as input variables), outputs (such as output variables), and logic operators (e.g., Boolean operators, numerical operators, etc.). In some embodiments, a block library may be provided that includes specific function blocks that provide mechanisms to convert Steps and Transitions of the SFC logic.

Figure 1:
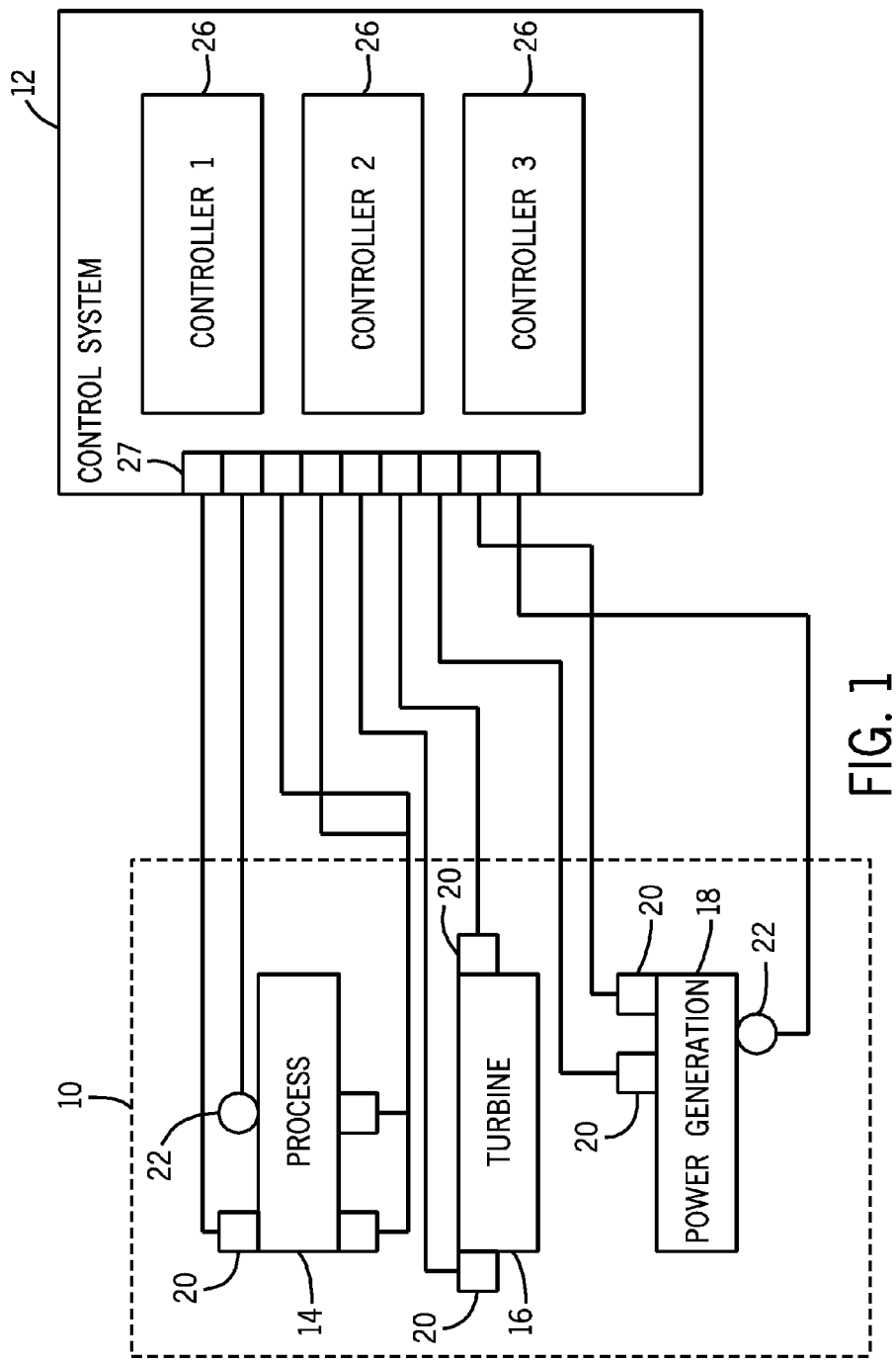
FIG. 1 is a schematic diagram of an implementation of a control system in accordance with an embodiment of the present invention.

FIG. 1 depicts a system 10 coupled to a control system 12 in accordance with an embodiment of the present invention. The system 10 may include, for example, a process 14, a turbine 16, a power generation component 18, or any other component or combination thereof. The process 14 may comprise a variety of operational components, such as electric motors, valves, actuators, sensors, or a myriad of manufacturing, processing, material handling and other applications. Further, the process 14 may comprise control and monitoring equipment for regulating process variables through automation and/or observation. The turbine 16 may include a steam turbine, a gas turbine, a wind turbine, a hydro turbine, or any combination thereof. For example, the turbine 16 may include a combined cycle having a gas turbine, a steam turbine, and a heat recovery steam generation (HRSG) system. Further-more, the turbine 16 may drive the power generation component 18, which may include an electrical generator. Alternatively, in some embodiments the turbine 14 and/or the power generation component may be solar-powered. The turbine 16 and power generation component 18 may include any number of operational components, such as motors, rotary components, power electronics, sensors, actuators, etc.

The illustrated process 14, turbine 16, and power generation component 18 may include any number of sensors 20 and actuators/motors 22. The sensors 20 may comprise any number of devices adapted to provide information regarding process conditions. For example, the sensors 20 may monitor temperature, pressure, speed, fluid flow rate, vibration, noise, exhaust emissions, power output, clearance, or any other suitable parameter. The actuators 22 may similarly include any number of devices adapted to perform a mechanical action in response to an input signal. For example, the actuators 22 may control a fuel injection rate, a diluent or water injection rate, a coolant rate, a power output level, a speed, a flow rate, a clearance, and so forth.

As illustrated, these sensors 20 and actuators 22 are in communication with the control system 12, such as through interfaces 24. The control system 12 may include one, two, three, or more controllers 26 (e.g., programmable logic controllers) that may operate in any manner suitable for monitoring and controlling the system 10. For example, such systems may be referred to as simplex (one controller), duplex (two controllers), triple module redundant (three controllers and referred to as "TMR") and may provide any suitable redundancy model. The sensors 20 and actuators 22 may be in direct communication with any or all of the controllers 26, for example, through a bus 27. These devices may be utilized to operate process equipment. Indeed, they may be utilized within process loops that are monitored and controlled by the control system 12 and the controllers 26. In certain embodiments, the controllers 26 may be separate and/or integral with the process 14, the turbine 16, and/or the power generation component 18.

Figure 2:
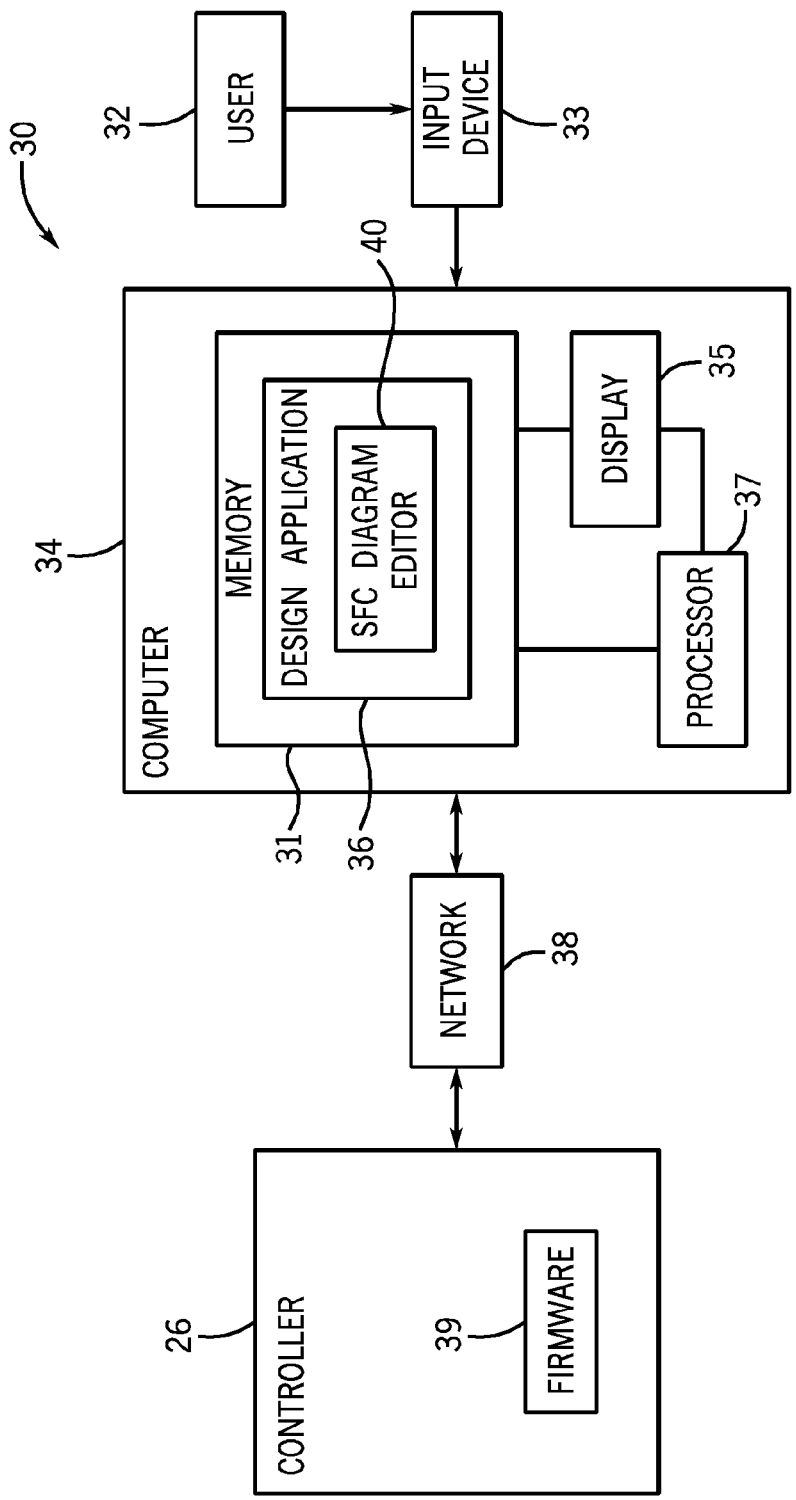
FIG. 2 is a schematic diagram of a system for designing and configuring control logic for the controller in accordance with an embodiment of the present invention.

FIG. 2 is a schematic diagram of a system 30 for designing control logic for the controller 26 in accordance with an embodiment of the present invention. A user 32 may interact with a computer 34 that executes a design application 36 for control logic. The computer 34 may include memory 31 (e.g., a tangible machine-readable medium) for storing the design application 36 and/or any other data or applications. The user 32 may interact with the computer 34 via input device 33 coupled to the computer 34. The input device 33 may be a mouse, trackball, keyboard, touch screen, voice recognition system, any suitable input device, or any combination thereof.

The computer 34 may be any suitable computer, such as a laptop, desktop, server, etc. In other embodiments, the computer 34 may be any portable electronic device capable of executing the design application 36. The computer 34 may include a display 35 to display various portions or screens of the design application 36 to the user 32. The display 35 may include a CRT display, an LCD display, an OLED display, an LED display, or any suitable display or combination thereof. Further, the computer 34 may include one or more processors 37 that may communicate with the memory 31 and execute the design application 36 and any other applications on the computer 34.

The computer 34 may be coupled to the controller 26 via a network 38. The network 38 may include any wired network, wireless network, or combination thereof, such as Ethernet, wireless Ethernet, etc. The controller 26 may include firmware 39 generally responsible for interpreting, compiling, and/or executing any control logic downloaded to the controller 26 from the computer 34 via the network 38.

To create control logic for the controller 26, the user 32 may start a new logic design or load an existing logic design in the design application 36. In one embodiment, the design application 36 may provide the user 32 with a Sequential Function Chart (SFC) diagram editor 40 for designing logic using the IEC 61131-3 standard (referred to as "SFC"). As described further below, the SFC logic created by the user 32, (which may be referred to as an SFC "data model") may include a variety of "Steps" and "Transitions" to define logic that monitors and controls the system 10.

In such an embodiment, the firmware 39 of the controller 26 may be incapable of interpreting, compiling, and/or executing SFC logic application code generated by the SFC design editor 40 of the design application 36. For example, the controller 26 may be capable of only interpreting, compiling, and/or and executing "blockware" application code, e.g., logic defined according to function blocks and not the SFC logic (SFC data model) created by the user 32 using the SFC design application 40.

Figure 3:
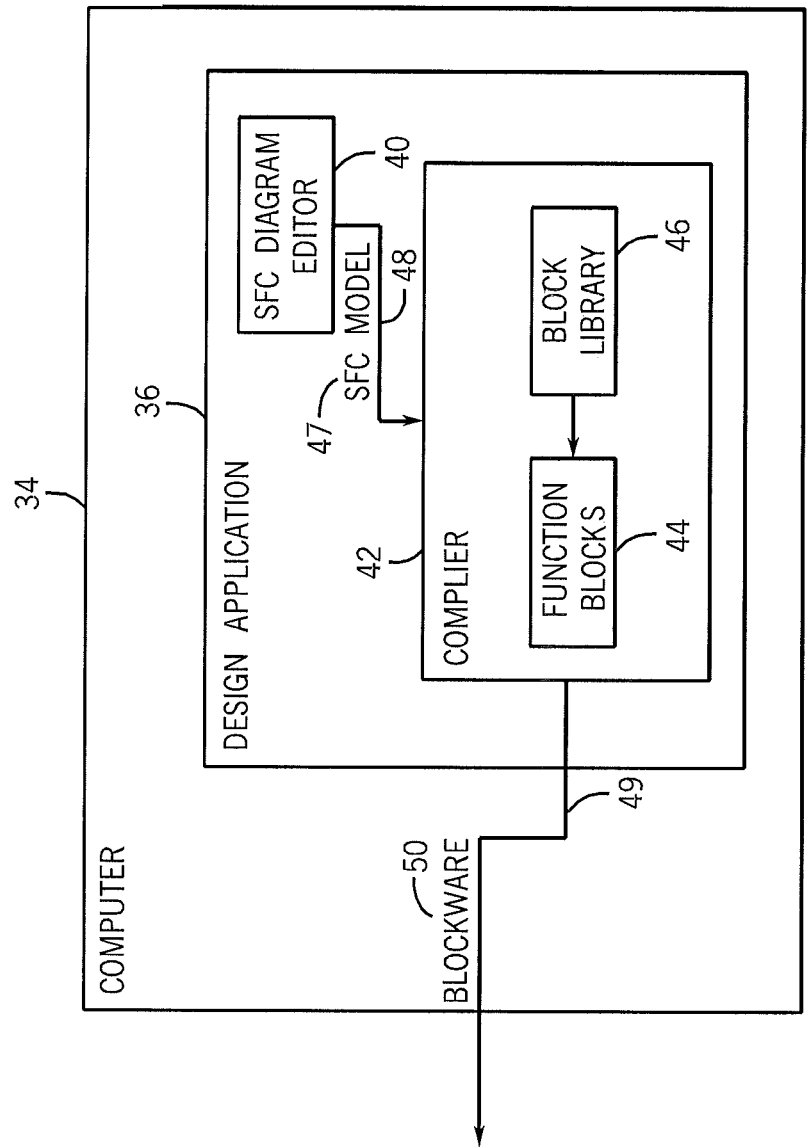
FIG. 3 depicts an embodiment of a design application that includes a blockware compiler in accordance with an embodiment of the present invention.

FIG. 3 depicts an embodiment of the design application 36 that includes an SFC-to-blockware compiler 42 in accordance with an embodiment of the present invention. As shown in the embodiment depicted in FIG. 3, the complier 42 is a part of the design application 36. However, in other embodiment the complier 42 may a separate application capable receiving output from the design application 36. The complier 42 may generate function blocks 44 and may include a block library 46 to facilitate generation of the function blocks 44. The block library 46 is described in further detail below.

As described above, the user 32 may design and edit an SFC data model 47 (SFC logic) on the SFC design editor 40. When the user 32 has completed the desired SFC data model 47, the complier 42 may automatically execute. In some embodiments, the complier 42 may execute after any change to the SFC model 47. In other embodiments, the complier 42 may execute after completion of an entire new SFC model 47. In yet other embodiments, the complier 42 may execute upon initiation by the user 32. Upon initiation of the upload, the SFC data model 47 may be provided to the complier 42 (as shown by arrow 48). The complier 42 compiles the SFC data model 47 (SFC logic) to function blocks 44 (i.e., blockware), such as by using the block library 46. As described below, the compiler 42 may convert each Step and Transition of the SFC data model 47 to a function block 44. These function blocks 44 describe the logic of the SFC data model 47 in a format interpretable, compliable, and executable by the firmware 39 of the controller 26. As shown by arrow 49, the complier 42 outputs blockware 50 (comprising function block logic 44) from the design application 36. The blockware 46 may be uploaded to the controller 26 over the network 38.

Figure 4:
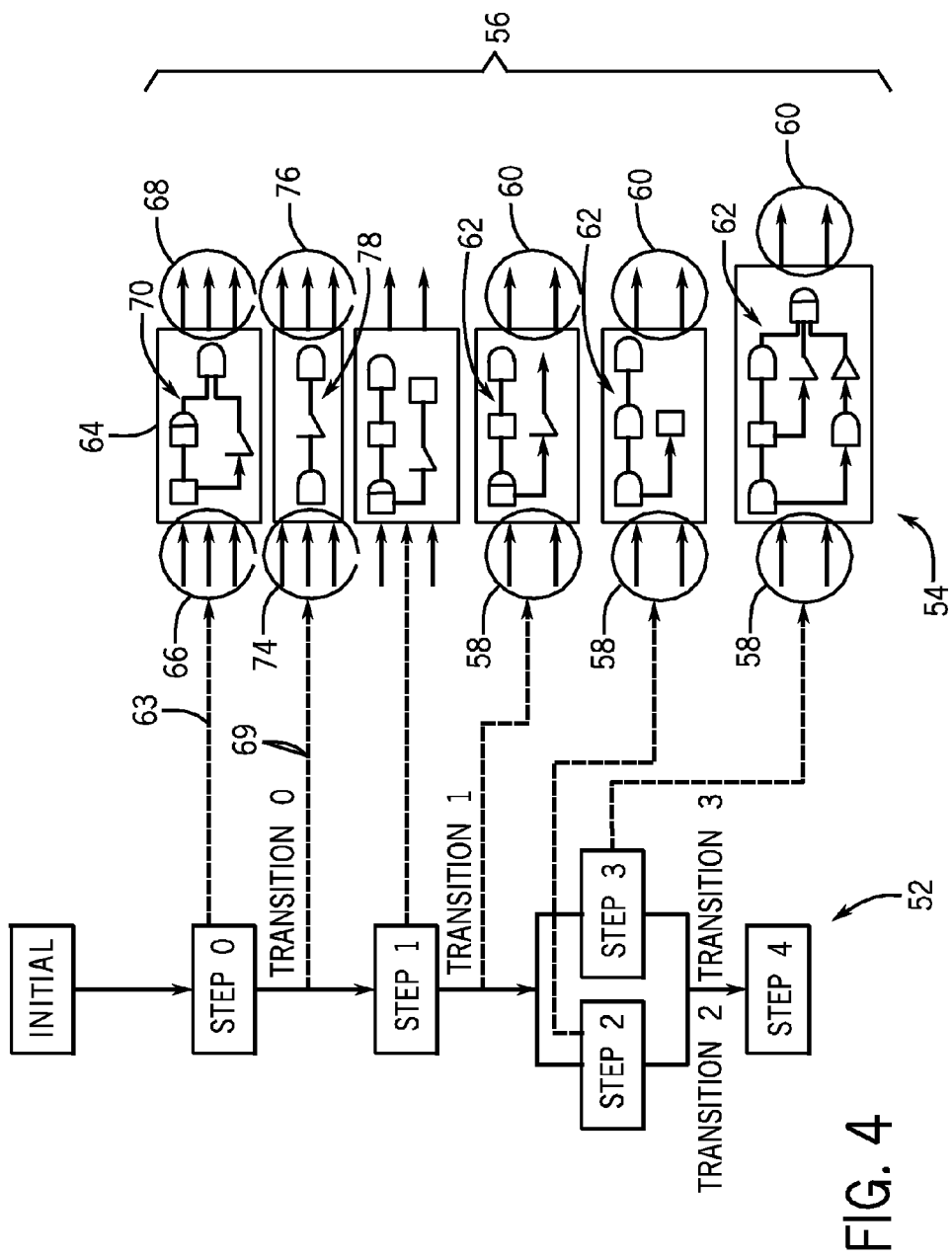
FIG. 4 is schematic of an SFC logic diagram and corresponding blockware generated by the compiler in accordance with an embodiment of the present invention.

FIG. 4 is schematic of an SFC logic diagram 52 and corresponding blockware 54 generated by the compiler 42 in accordance with an embodiment of the present invention. It should be appreciated that the SFC logic diagram 52 and blockware 54 are simplified examples shown for illustrative purposes, and the complier 42 may generate any detail and complexity of blockware 54 from any SFC logic diagram 52 created by the user 32.

As shown in FIG. 4, the SFC logic diagram 52 may include any number of Steps and Transitions specified by the user 32. Beginning with an Initial Step block, the SFG logic diagram includes Step 0 connected to Step 1 via Transition 0; Step 1 connected to Step 2 and Step 3 via Transition 1; Step 2 connected to Step 4 via Transition 2; Step 3 connected to Step 4 via Transition 3, and finally ending in Step 4. As will be appreciated, each Step and Transition may define specific logic and corresponding actions used based on the sensors 20, actuators/motors 22, or any other component of the system 10 and process 14, turbine 16, and power generation components 18. These Steps and Transitions define operating logic for the system 10 enabling monitoring and control of the system 10.

As described above, after the user 32 creates the SFC logic diagram 52, the SFC logic diagram 52 may be selected for upload to the controller 46. The complier 42 complies the SFC data model (SFC logic) depicted in SFC logic diagram 52 to function blocks 56, as illustrated by the blockware diagram 54.

converted to a function block 56 suitable for interpretation, compilation, and execution by the firmware 39 of the controller 26.

Additionally, the conversion of the various Steps and Transitions of the SFC model 47 may include the use of the block library 46. The block library 46 may include any number of specific function blocks that provide mechanisms for the blockware 50 in view of the converted SFC logic of the SFC model 47. For example, each block of the block library 46 may implement one or more SFC functions and define corresponding inputs and outputs for execution of these one or more functions. An embodiment of the block library 46 is provided below in Table 1:

TABLE 1

| Block | Function | Inputs | Outputs |
|---|---|---|---|
| Action Control Block | Implement SFC Action Qualifiers | Action Qualifier<br>T<br>P<br>Reset_SFC<br>SFC_Status<br>Enable | A<br>Current_Time<br>Done |
| Active Step Time Block | Accumulate the amount of time a Step has been Active | Reset_SFC<br>SFC_Status<br>Enable | Accumulated Time |
| Transition Control Block | Enable SFC through a transition; hold a transition; force a transition, acknowledge a hold on a transition | Transition_Condition<br>Reset_SFC<br>Force<br>Hold<br>Hold_Acknowledge<br>SFC_Status<br>Configuration<br>Enable | Done<br>Steps_Array<br>Transitions_Array<br>Transitions_Progression_Status_Array<br>Complete<br>Configuration_Validated<br>Configuration_Valid<br>Configuration_Validation_Error_Code<br>Number of Configuration_Records |
| SFC Control Interface Block | Change SFC's status; change SFC's mode of operation; reset or pause SFC | Run<br>Complete<br>Reset<br>SFC_Mode<br>Transition_Progression_Status_Array<br>Major_Structure_Reset<br>Parallel_OnlineLoad_Reset | SFC_Status<br>Major_Version<br>Reset_SFC<br>Steps_Array<br>Step_Times_Array<br>Step_Actions_Of_Interest_Status_Array<br>Transitions_Array<br>Transitions_Holds_Array<br>Transitions_Previous_Free_Running_Holds_Array<br>Transitions_Holds_Acknowledge_Array<br>Transitions_Forces_Array |
| Transition Activation Control Block | Enable a Step's associated Transitions when the Step is Active | Steps_Array<br>Reset_SFC<br>SFC_Status<br>Configuration | Transitions_Array<br>Configuration_Validated<br>Configuration_Valid<br>Configuration_Validation_Error_Code<br>Number_Of_Configuration_Record |
| Actions of Interest Control Block | Implement the SFC Actions of Interest feature | Action_Control_Status_Array<br>Action_Status_Array<br>SFC_Status<br>Reset_SFC<br>Configuration | Actions_Of_Interest_Status<br>Configuration_Validated<br>Configuration_Valid<br>Configuration_Validation_Error_Code<br>Number_Of_Configuration_Records |

As shown in FIG. 4, each function block 56 may receive inputs 58 and produce outputs 60, and may include any number of logic components 62, such as logic gates, Boolean evaluators, numerical evaluators, etc. For example, as shown by arrow 63, Step 0 may be converted to a function block 64 having inputs 66, outputs 68, and logic components 70. Similarly, as shown by arrow 69, Transition 0 may be converted to a function block 72 having inputs 74, outputs 76, and logic components 78, and so on. In this manner, each step or transition of the SFC logic depicted in SFC logic diagram 52 is It should be appreciated that some embodiments may use any or all of the block library 46 described above. Additionally, in some embodiments, additional blocks may be added to the block library 46 to facilitate compilation of the SFC data model 47 to the blockware 50. In other embodiments, the inputs and/or outputs of the blocks of the block library 46 described above may be modified for a specific implementation of a SFC.

Figure 5:
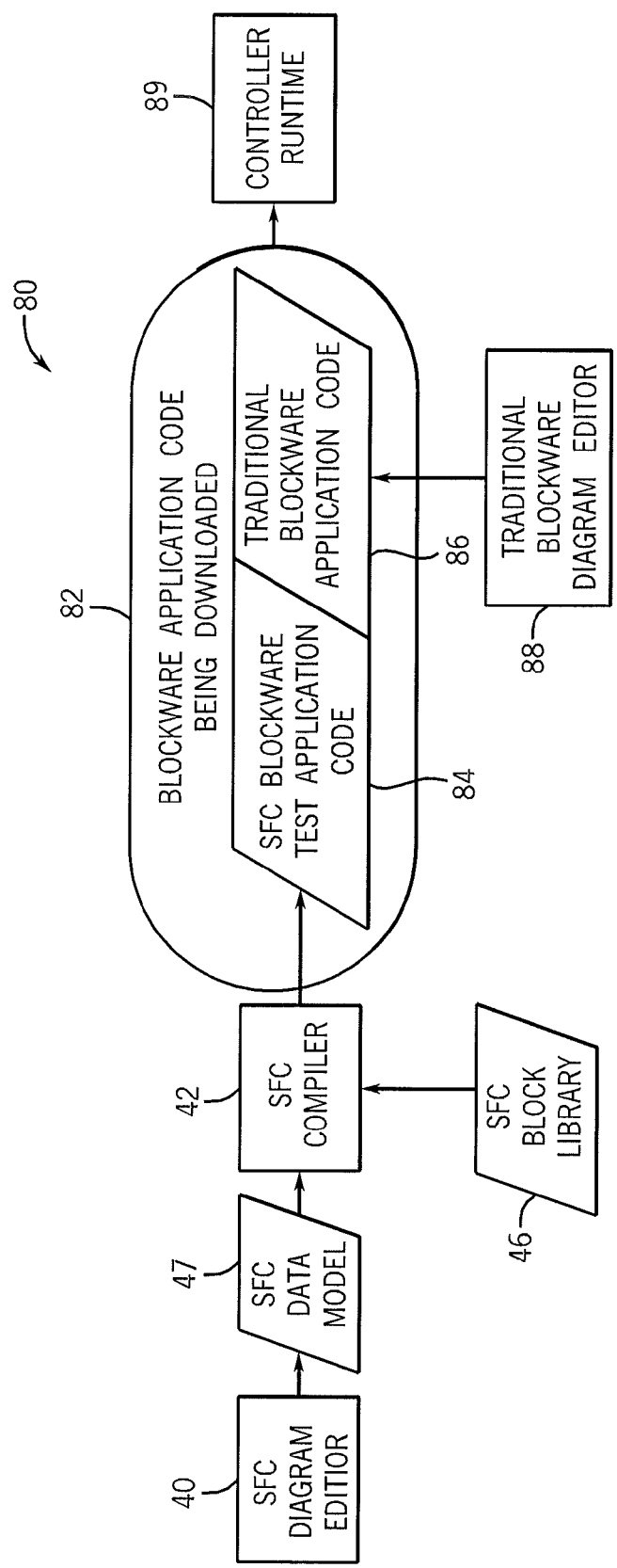
FIG. 5 is flowchart of a process for generating blockware from SFC logic in accordance with an embodiment of the present invention.

FIG. 5 is a flowchart of a process 80 for generating blockware, e.g. function blocks, from SFC logic as described above in accordance with an embodiment of the present invention.

Any or all steps of the process 80 may be implemented in hardware, software (such as code stored on a tangible machine-readable medium), or combination thereof. Initially, an SFC logic interface, such as the SFC diagram editor 40, may be provided to the user 32. The output from the SFC diagram editor 40 is the SFC data model 47. The SFC data model 74 may be application code defining the SFC logic of the SFC data model 47.

The SFC data model 47 is provided to the compiler 42. As described above, the compiler 42 may access and use the block library 46 to compile the SFC data model 47 to blockware application code, such as by converting the Steps and Transitions of the SFC data model 47 to function blocks 56 as shown in FIG. 4. The blockware application code is downloaded to the controller 26 (e.g., uploaded from the computer 34), as shown in block 82.

The blockware application code 82 includes the SFC blockware task application code 84 complied from the SFC Data Model 74. Additionally, in some embodiments, the blockware application code 82 may include traditional blockware application code 86, e.g., code not compiled from the SFC Data model 47. For example, the traditional blockware application code 86 may be created from a traditional blockware diagram editor 88, e.g., a blockware logic interface, executing on the computer 34. Finally, the downloaded blockware 82 is executed as a part of a controller runtime 89, e.g., after interpretation, compilation, and/or execution by the controller firmware 48. Advantageously, the firmware 39 of the controller 26 does not need to be modified to use the SFC data model 47.

Technical effects of the invention include converting IEC 61131-3 SFC logic to function block logic for use by a controller. Other technical effects include use of a block library defining specific function block mechanisms for converting the SFC logic to the function block logic.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method, comprising:
   receiving Sequential Function Chart (SFC) logic comprising Steps and Transition on a physical computing device;
   converting the Steps and Transitions of the Sequential Function Chart logic to function block logic on the physical computing device; and
   uploading the function block logic from the physical computing device to a controller, wherein converting the Steps and Transitions of the SFC logic comprises converting the Steps and Transitions of the Sequential Function Chart logic to the function block logic using a block library stored on both the physical computing device and in the controller, the block library comprising a plurality of specific function blocks implementing SFC functionality that provide executable code to convert Steps and Transitions of the SFC logic to the function block logic; and
   executing the function block logic in the controller by using the block library stored in the controller.

2. The method of claim 1, comprising providing an SFC editor to a user of the physical computing device.

3. The method of claim 1, comprising providing a function block editor to a user of the physical computing device.

4. The method of claim 1, wherein the plurality of specific function blocks comprise an Active Control Block, an Active Step Time Block, a Transition Control Block, an SFC Control Interface Block, a Transition Activation Control Block, an Actions of Interest Control Block, or a combination thereof.

5. The method of claim 1, comprising displaying the SFC logic on a display of the physical computing device.

6. The method of claim 1, wherein uploading the function block logic comprises programming the controller with the function block logic.

7. A physical computing device, comprising:
   a tangible machine-readable medium comprising code adapted to:
      provide a Sequential Function Chart (SFC) editor to a user;
      receive first application code comprising an SFC model;
      convert the first application code to a second application code comprising blockware by using a block library stored on both the physical computing device and in a controller, the block library comprising a plurality of specific function blocks implementing SFC functionality that provide executable code to convert Steps and Transitions the SFC model to the blockware; and
      output the second application code, wherein the second application code is configured to be executed by the controller by using the block library stored in the controller.

8. The device of claim 7, wherein the tangible machine-readable medium comprises code further adapted to program the controller with the second application code.

9. The device of claim 8, wherein the controller cannot execute the first application code and can only execute the second application code.

10. The device of claim 7, comprising a display configured to display an interface of the SFC editor.

11. The device of claim 7, wherein the blockware comprises a plurality of function blocks corresponding to the SFC logic.

12. A system, comprising:
   a programmable logic controller comprising function blocks executable to perform one or more control functions, wherein the function blocks are translated, via a computer, from Sequential Function Chart logic via a block library having a plurality of specific function blocks that provide executable code implementing SFC functionality to convert Steps and Transitions of the Sequential Function Chart logic to the function blocks, wherein the block library is stored in both the programmable logic controller and the computer, and wherein the function blocks are configured to be executed by the programmable logic controller by using the block library stored in the programmable logic controller.

13. The system of claim 12, comprising:
   the computer coupled to the programmable logic controller via a network, wherein the computer comprises:
   a processor;
   a tangible machine-readable medium; and
   an application stored on a tangible machine readable medium and executable by the processor, wherein the application is configured to provide a Sequential Function Chart editor to a user and output first application code comprising SFC logic, and the application is configured to convert the first application code to a second application code comprising the function blocks executable by the programmable logic controller.

14. The system of claim 12, comprising a power generation component coupled to the programmable logic controller.

15. The system of claim 12, comprising a turbine coupled to the programmable logic controller.

16. The system of claim 12, wherein the function blocks define one or more inputs, one or more outputs, and logic operators acting on the one or more inputs to produce the one or more outputs.

17. The system of claim 12, wherein the controller cannot execute the first application code and can only execute the second application code by using the block library stored in the programmable logic controller.

* * * * *